(12) United States Patent
Green et al.

(10) Patent No.: US 7,949,660 B2
(45) Date of Patent: May 24, 2011

(54) METHOD AND APPARATUS FOR SEARCHING AND RESOURCE DISCOVERY IN A DISTRIBUTED ENTERPRISE SYSTEM

(75) Inventors: Stephen J. Green, Wakefield, MA (US); Paul B. Lamere, Manchester, NH (US); Jeffrey L. Alexander, Arlington, MA (US); Karl R. Haberl, Tyngsboro, MA (US)

(73) Assignee: Oracle America, Inc., Redwood City, CA (US)

( * ) Notice: Subject to any disclaimer, the term of this patent is extended or adjusted under 35 U.S.C. 154(b) by 0 days.

(21) Appl. No.: 12/557,403

(22) Filed: Sep. 10, 2009

(65) Prior Publication Data

US 2009/0327250 A1 Dec. 31, 2009

Related U.S. Application Data

(63) Continuation of application No. 11/477,021, filed on Jun. 28, 2006, now abandoned.

(51) Int. Cl.
*G06F 17/30* (2006.01)
(52) U.S. Cl. ........................................ 707/737; 709/224
(58) Field of Classification Search .......... 707/737–740, 707/708–712; 709/224–228; 705/14.14, 705/14.27
See application file for complete search history.

(56) References Cited

U.S. PATENT DOCUMENTS

| | | | |
|---|---|---|---|
| 7,181,438 B1 * | 2/2007 | Szabo | 707/999.002 |
| 7,185,081 B1 * | 2/2007 | Liao | 709/224 |
| 7,275,063 B2 | 9/2007 | Horn | |
| 2003/0177127 A1 * | 9/2003 | Goodwin et al. | 707/10 |
| 2004/0002967 A1 | 1/2004 | Rosenblum et al. | |
| 2005/0086205 A1 | 4/2005 | Franciosa et al. | |
| 2005/0228774 A1 | 10/2005 | Ronnewinkel | |
| 2006/0265746 A1 | 11/2006 | Farley et al. | |
| 2009/0157762 A1 * | 6/2009 | Yerneni et al. | 707/201 |

OTHER PUBLICATIONS

Yang. Y., Expert Network: Effective and Efficient Learning from Human Decisions in Text Categorization and Retrieval, Jul. 1994, 10 pages.
Singhal, A., Mitra, M., and Buckley, C., Learning Routing Queries in a Query Zone, SIGIR 97, Aug. 1997, 8 pages.
Microsoft Press Dictionary, 5th Edition, Copyright 2002, 4 pages.

* cited by examiner

*Primary Examiner* — Wilson Lee
(74) *Attorney, Agent, or Firm* — Osha • Liang LLP (57) ABSTRACT

A method for searching and resource discovery in a distributed enterprise (DE), the method including: generating a first classifier for a first repository in the DE; generating a second classifier for a second repository in the DE, where the second classifier has a vector element identifying a location of the second repository; submitting a copy of the second classifier to a web server of the first repository; obtaining a resource at the first repository after submitting the copy of the second classifier; matching the resource to the copy of a second classifier; sending a copy of the resource to the second repository using the vector element; and storing the copy of the resource in the second repository.

20 Claims, 10 Drawing Sheets

| 402 | 404 | 406 | 408 |
|---|---|---|---|
| FEATURE 1 | FEATURE 2 | FEATURE 3 | ... FEATURE N |
| WEIGHT 1 | WEIGHT 2 | WEIGHT 3 | ... WEIGHT N |
| 410 | 412 | 414 | 416 |

| 502 | 504 | 506 | 508 |
|---|---|---|---|
| FEATURE 1 | FEATURE 2 | FEATURE 6 | ... FEATURE M |
| WEIGHT 1 | WEIGHT 2 | WEIGHT 6 | ... WEIGHT M |
| 510 | 512 | 514 | 516 |

500

TARGET REPOSITORY ID — 518

METHOD AND APPARATUS FOR
SEARCHING AND RESOURCE DISCOVERY
IN A DISTRIBUTED ENTERPRISE SYSTEM

CROSS-REFERENCE TO RELATED
APPLICATIONS

This application is a continuation of U.S. patent application Ser. No. 11/477,021, filed on Jun. 28, 2006, now abandoned. Accordingly, this application claims benefit of U.S. patent application Ser. No. 11/477,021 under 35 U.S.C. §120.

BACKGROUND

This invention relates to resource search and discovery systems that operate in a distributed enterprise system, such as a computer network or an intranet. These systems are conventionally called enterprise search systems (ESSs). Such a system might be available to users working in the enterprise or might be used as a search tool available to users outside of the organization via a mechanism such as a company website.

Currently, ESSs are centralized in that there is typically one application that is responsible for collecting content from the enterprise network or intranet. This application is commonly known as a "spider" or "robot" and locates documents. An indexer then indexes the content of those documents. Subsequently, other applications allow users to query the index, for example, via a web-based query interface.

There are a number of problems that such a centralized approach creates. First, in the general case, the people responsible for the administration of the ESS are not the people who are creating the content. This means that an administrator cannot easily tell whether a particular document should be included in the index or not. Thus, the administrators of a centralized system tend to spend most of their time making sure that the machines stay running, that the spider does not run out of control or become hung, and that search results for common queries are relevant.

Second, the content of the index in the ESS can rapidly become out-of-date with respect to the actual documents available on the system. Documents that are removed from the system result in "dead links" in search results, which leads to frustration for searchers. At the same time, new content is not included in the index immediately: it must wait until it is located by the spider. This delay can lead to duplication of intellectual effort if, for example, a problem must be resolved.

Third, because people cannot find the information that they need, local search systems start to appear. For example, there are currently many desktop search engines available. A desktop search engine is a program that operates a desktop to index personal content such as e-mail messages, visited web pages, and local documents in a variety of formats. Such a local search system could be used, for example, to search an archive of e-mail messages sent to a number of aliases related to a given project. Other local search systems may involve a search engine running on a server shared by a group of users. These local search systems locate more timely and up-to-date content, but move the burden of system administration to the people creating the content. Furthermore, because local search systems often use differing technologies, such systems lead to a proliferation of search technologies within the enterprise. Attempting to discover the existence of these local systems and then to reconcile the search results produced by a number of different search engines is a difficult problem.

Fourth, people who have content that they would like to make available in the enterprise have no easy way to ensure that this content is included in the ESS. A typical strategy used to make sure that the information is available in the enterprise is to include the information on a web server, and then to attempt to make the spider visit that web server.

SUMMARY

In accordance with the principles of the invention, personal data repositories are created by individual users or groups of users. Users identify resources that they want to keep and may suggest a few keywords that describe each resource. Classifiers can then be generated from collections of resources that have been assigned the same keyword. Each generated classifier also specifies a target repository into which a resource that matches that classifier is added. Users can submit classifiers that they created to other repositories. Later, when a user adds a resource to a repository, it is checked against all classifiers that have been created by the user and all classifiers submitted to the repository by other users. If the new resource matches any classifier, the resource is added to the repository specified in the classifier.

In one embodiment, as resources are added to a repository, the resources are tagged with one or more keywords. This allows classifiers to be continually built and tested against a particular set of user keywords.

In another embodiment, users are notified when resources are added to their repositories so that they can review the keywords that have been assigned to each resource and perhaps assign different or additional keywords. In still another embodiment, users poll other repositories to determine when those other repositories have added resources to their repositories.

In yet another embodiment, instead of actually transferring references or content between repositories, a first user associated with a first repository could request that a second repository associated with a second user simply notify the first repository whenever the second repository adds new resource content to a particular category in the second repository.

In another embodiment, in situations where a user works on materials that, for security reasons, he or she cannot allow anyone else to see, the user could decide to share his classifier for a class of documents without having to share the documents from which the classifier was constructed.

In still another embodiment, a user can simply forward a classifier that he or she has constructed to another repository for use in that repository. Further, a user can also forward an entire classifier tree, or trees, to another user to enable that other user to classify content in the same manner as the first user

DETAILED DESCRIPTION

Figure 1:
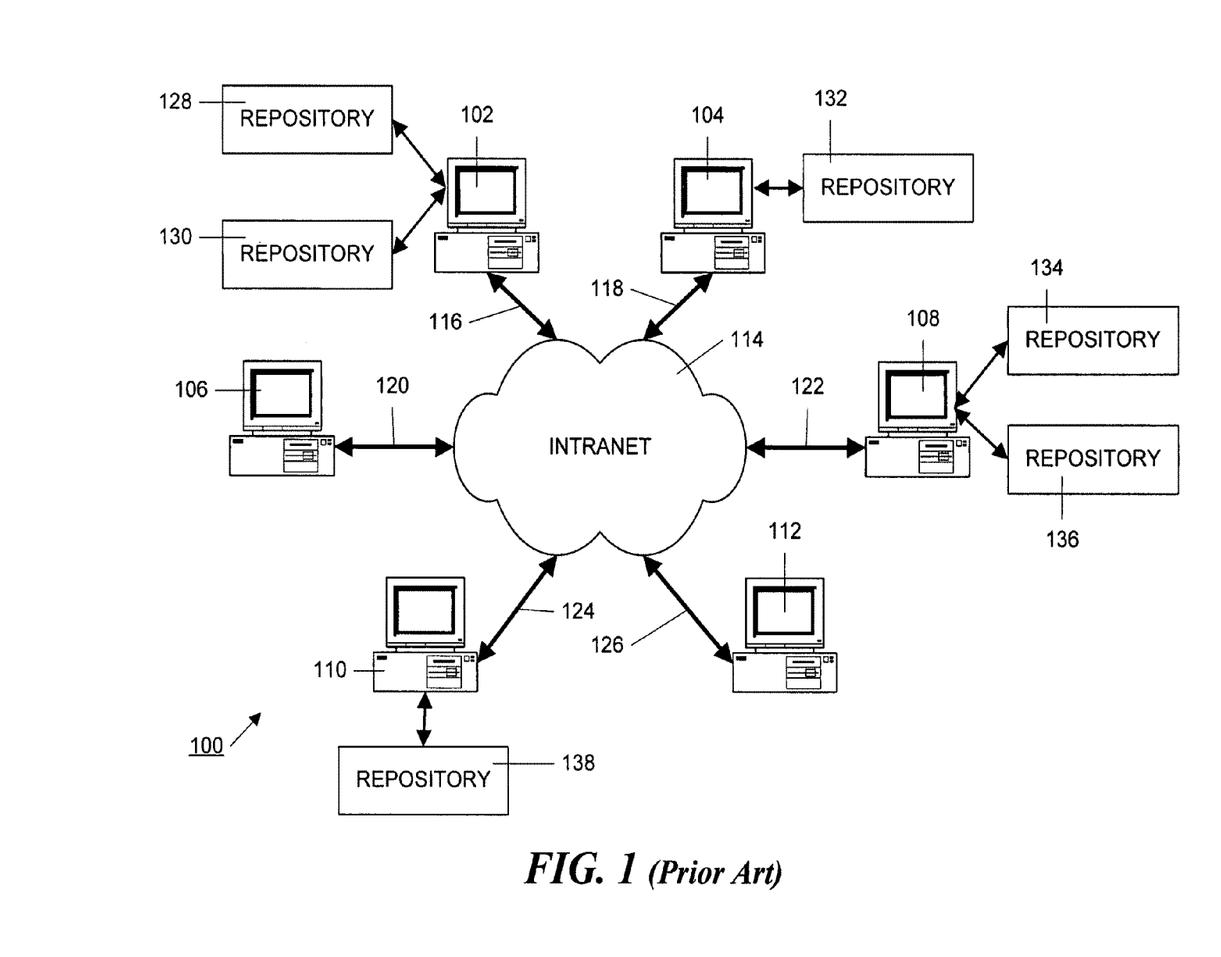
FIG. 1 is a block schematic diagram of a conventional distributed enterprise system in which users have assembled private resource repositories.

FIG. 1 shows a conventional enterprise computer system 100 that includes computers 102-112 connected together by an intranet 114 as schematically illustrated by arrows 116-126. In the enterprise system 100, resource repositories are personal to each user. For example, resource repositories 128 and 130 are associated with users working on computer 102. Similarly, resource repository 132 is associated with a user operating on computer 104. Resource repositories 134 and 136 are associated with users working on computer 108 and resource repository 138 is associated with a user operating on computer 110. In accordance with the principles of the invention, each repository is assigned a Uniform Resource Identifier (URI) to identify that repository for communication, as described below, with other repositories.

Figure 2:
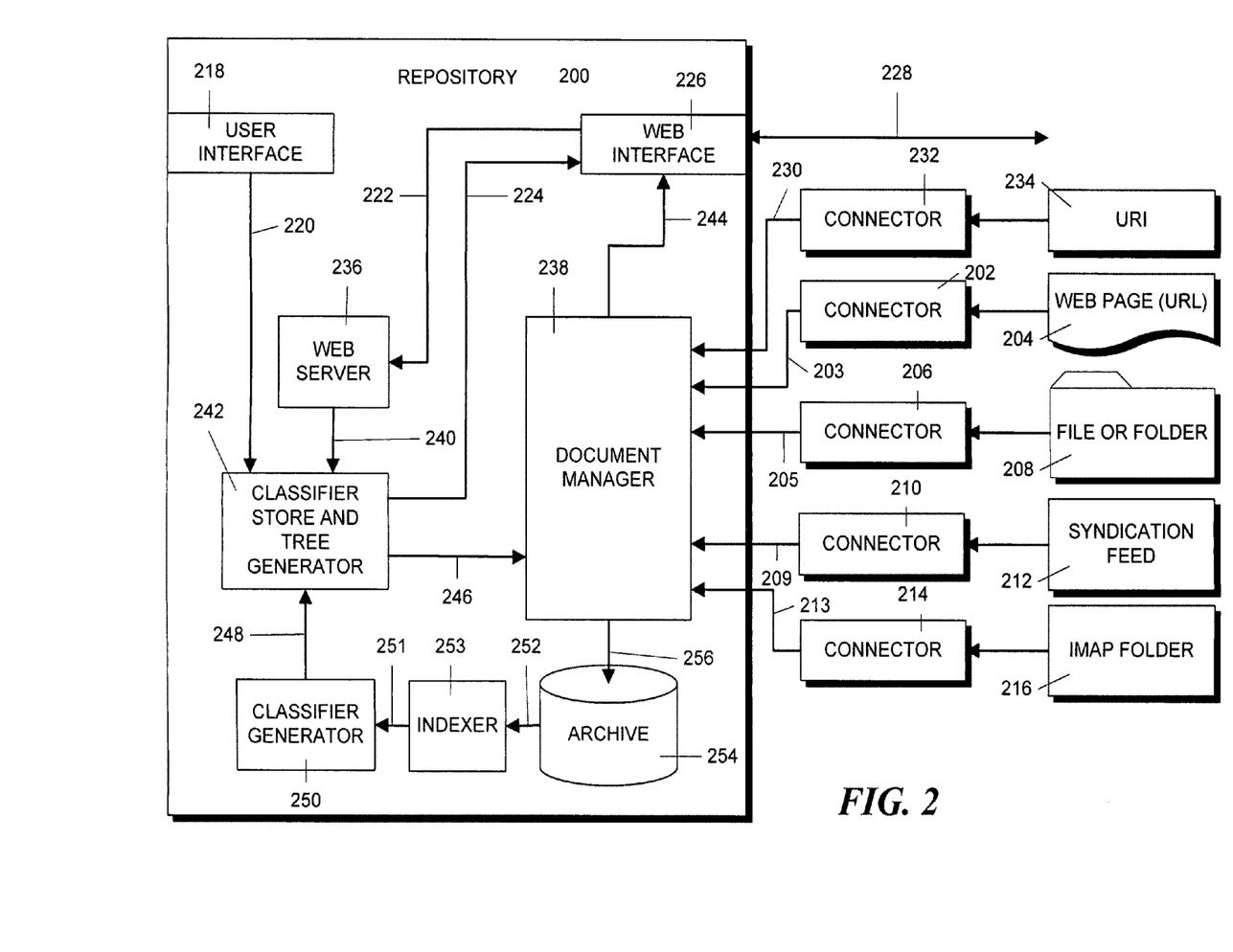
FIG. 2 is a more detailed block schematic diagram of a private repository constructed in accordance with the principles of the invention.

Each of repositories 128-138 can retrieve, store and index resources. A more detailed block diagram of a typical repository 200 is shown in FIG. 2. Other repositories in the system would have the same, or a similar, configuration. Repository 200 retrieves information from a resource by means of a connector that is particular to that resource. The information is then added to the repository by adding either a reference to the information or a copy of the content of that information to the repository. If a copy of the information content is retrieved and archived, then the information will still be available if the original source disappears. Several illustrative connectors are shown in FIG. 2 and others would be known to those skilled in the art. These connectors can retrieve information periodically or one time only. For example, connector 202 can fetch a web page 204 located at a designated Uniform Resource Locator (URL) and retrieve the content of that page. The retrieved content is presented to document manager 238 as indicated schematically by arrow 203. Similarly, connector 206 may monitor a particular folder 208 residing on a file system. Any changes in that folder will be retrieved by connector 208 and their contents provided to document manager 238. Alternatively, connector 206 may monitor a particular directory 208 in a file system, retrieving the content of any files placed in the directory. A connector, such as connector 210 may monitor a "syndication feed" 210, such as a Really Simple Syndication (RSS) feed or an Atom feed, retrieving all articles from the feed and presenting the content to document manager 238. In addition, a connector, such as connector 214, can monitor an Internet Message Access Protocol (IMAP) folder so that electronic mail or bulletin board messages added to the folder are retrieved. This monitoring function can also be used where document manager 238 has its own email address.

Document manager 238 stores the references or content that it receives from connectors 202, 206, 210 and 214 in an archive 254 as indicated schematically by arrow 256. As mentioned previously, retrieved content can be archived to ensure that any search returns links to resources that can be retrieved from their original location, if the original resource still exists, or from the archive 254, if the original resource does not exist.

One of the capabilities of a repository, such as repository 200, is that the incoming resources can be evaluated against classifiers in the repository in order to suggest to the user one or more keywords or categories for each resource that is being placed into the repository. This evaluation generally happens before a user has the opportunity to assign keywords to the resource so that resources that match classifiers can be tagged with appropriate keywords and presented to the user. The user would then typically verify that the system-generated keywords are correct or assign new or additional keywords. The classifiers can be manually built by the user or the classifiers can be automatically and dynamically created and maintained. In particular, in one embodiment discussed in more detail below, incoming resource content can be indexed by indexer/search engine 253 and then provided to a classifier generator 250 in order to provide classifiers for the information in the archive 254.

In accordance with this embodiment, incoming resource information that is not automatically classified into any existing category is placed in an unclassified category. Once this category contains a predetermined number of resource information documents, the user is notified and a classifier for that category can be constructed. An exemplary arrangement for automatically generating this classifier is illustrated in FIGS. 3-7. In particular, when the unclassified category contains the predetermined number of documents, the user associated with that repository is notified, for example, by means of a user interface 218.

The user can then manually create a new category and rate each document in the unclassified category indicating whether it is relevant or not relevant to the new category. Alternatively, the documents can be provided to an indexer/search engine 253 as schematically indicated by arrow 252. The indexer then indexes the documents. The documents, ratings and indexes are then applied to a classifier generator 250 from the indexer search engine 253 as indicated schematically by arrow 251.

Figure 3:
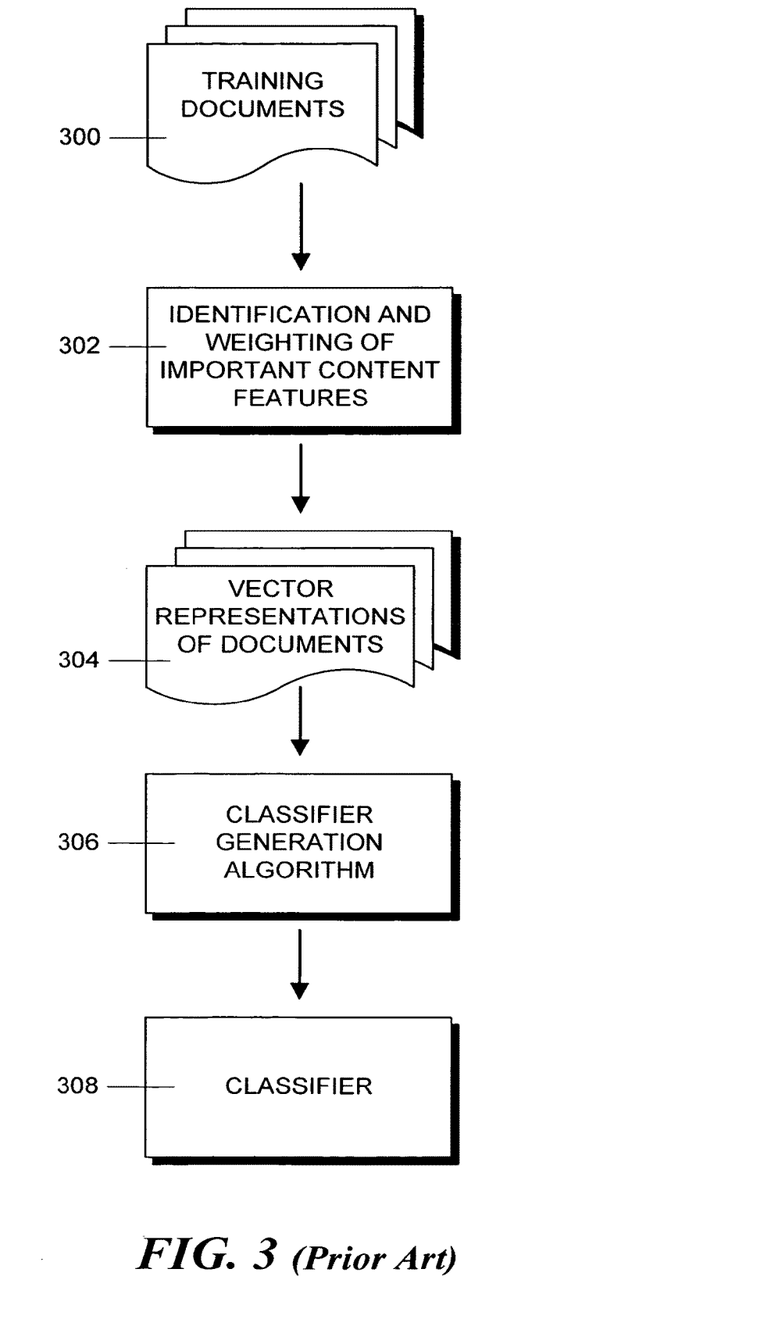
FIG. 3 is a block schematic diagram of a conventional process for automatically generating document classifiers from a training set of documents.

FIG. 3 schematically illustrates a conventional process that can be used by classifier generator 250 for automatically building a classifier from a set of "training" documents 300 that have been manually rated as relevant or not relevant for a selected category. In the discussion that follows, text classifiers are used for illustrative purposes. However, the inventive principles can be extended to other types of documents in a straightforward manner using known feature extraction algorithms. Almost all current information retrieval (IR) systems use a "vector space representation" approach for documents. With this approach, each document in the system is represented by a vector in N-space, where N is the number of unique features in the IR system.

Generally, features in text documents correspond to text terms, but several text terms may be clustered into a text feature using known techniques. Typically, each vector has multiple components, each of which, in turn, comprises a text feature extracted from the document and a numerical weight associated with that feature. Thus, the first step 302 in generating a classifier is to process the training documents 300 in order to extract the content features associated with the vector representing each document and to assign a numerical weight to each feature. This is a conventional process in which a stripper is used to remove any formatting information and graphics from the document, producing a stream of plain text. Next, a parser parses the plain text stream into words or word combinations are features in the IR system. Some mechanism, such as the frequency of occurrence of the feature in the document, is used to assign a weight to each feature.

Figure 4:
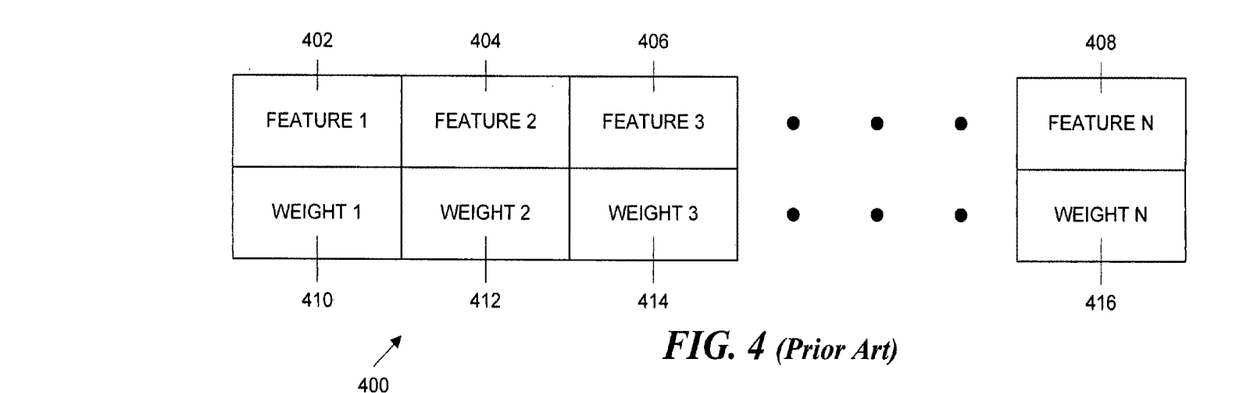
FIG. 4 is a schematic diagram that represents a typical manner in which features and associated weights can be used to represent a document as weighted feature vector.

The result is a vector such as that illustrated in FIG. 4 for each training document. The vector 400 comprises features 402, 404, 406 and 408 that are selected from the features used in the IR system. Each feature 402-408 has an associated weight 410, 412, 414 and 416. Each feature in the system may be represented or, alternatively, features whose weight is zero may be omitted from the vector 400. A vector is generated for each training document to generate a set of vector representations 304.

Figure 5:
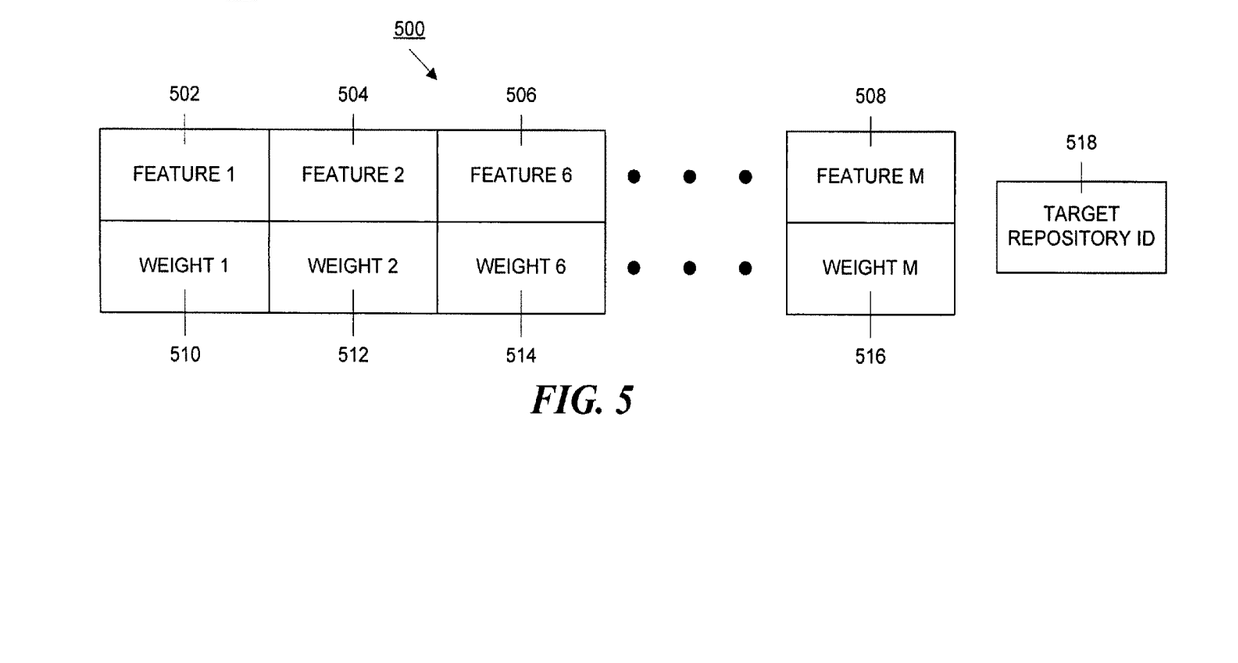
FIG. 5 is a schematic diagram that represents features and associated weights that can be used to represent a classifier as weighted feature vector including a target repository for archiving the document content.

The vector representations 304 are provided to a classifier generation algorithm, of which many are well-known. Two such algorithms are the Rocchio Algorithm described in "Learning Routing Queries in a Query Zone", A. Singhal, M. Mitra and C. Buckley, *SIGIR '97: Proceedings of the 20th Annual International ACM SIGIR Conference on Research and Development in Information Retrieval*, ACM Press, New York, N.Y. (1997) and the K-Nearest Neighbors Algorithm. See, for example, "Expert Network: Effective and Efficient Learning from Human Decisions in Text Categorization and Retrieval", Y. Yang, *Proceedings of SIGIR-94, 17th ACM International Conference on Research and Development in Information Retrieval*, Springer Verlag, Heidelberg, Germany (1994). The result is a classifier 308. Classifiers, such as classifier 308, are also generally represented as a weighted feature vector, where each feature is a feature selected from the training documents for the classifier. Such a vector is illustrated in FIG. 5. In vector 500, features 502, 504, 506 and 508 are associated with weights 510, 512, 514 and 516, respectively. In accordance with the principles of the invention, vector 500 also contains a target repository 518 identifier which may be the URI assigned to that repository. As will be described below, after a document manager classifies a document, it will send that document to the repository specified in the target repository identifier. Normally, the target repository would be the repository in which the document manager that classifies the document resides. However, in accordance with the principles of the invention, the identified repository could also be another repository to which the classified document is sent. The new classifier generated by the classifier generator 250 is stored in a classifier store and tree generator 242 as illustrated schematically by arrow 248.

With the document and classifier represented as weighted feature vectors, a determination can be made whether a document matches a classifier by comparing the vectors, for example by forming a "dot product" of the vector representing the document with the vector representing the root classifier. The dot product process produces a value and if this dot product value exceeds a threshold which is specific to the classifier, then a match is determined. Otherwise, no match occurs.

Figure 6:
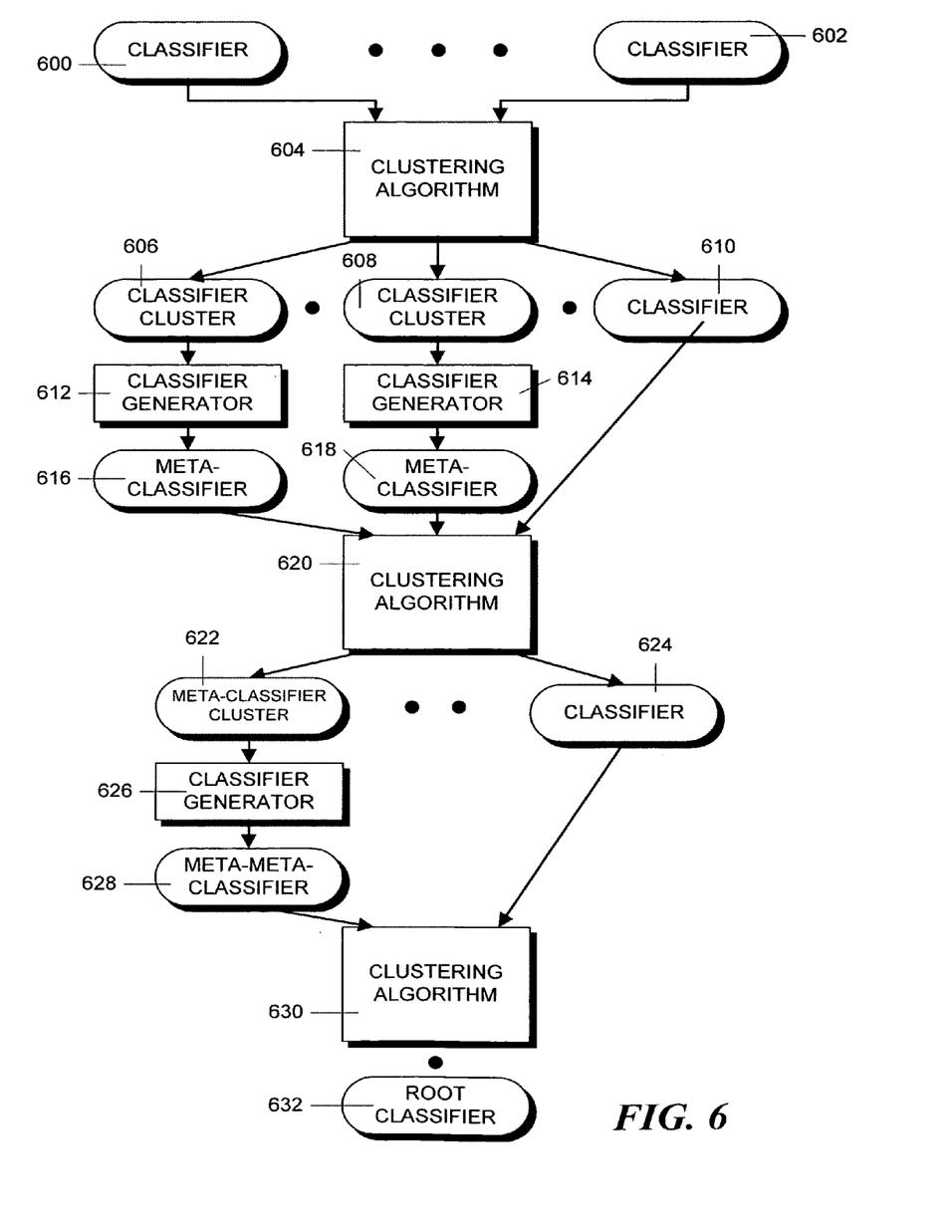
FIG. 6 is a schematic diagram that illustrates processing of classifiers to generate meta-classifiers.

Weighted feature vectors that represent the classifiers can be treated as special "documents" and processed accordingly. For example, clusters of "classifier documents" that contain similar features can be generated. Clustering can be performed by simply counting the number of features that two classifiers have in common or by computing the similarity of the vector representations using conventional clustering algorithms, such as the single-linkage clustering algorithm and the k-means clustering algorithm. A variety of other conventional algorithms that are suitable for use with the invention are discussed in "Data clustering: a Review", A. K. Jain, M. N. Murty and P. J. Flynn, *ACM Computing Surveys*, v. 31, n. 3, pages 264-323, ACM Press, New York, N.Y. 1999. This process is illustrated in FIG. 6 and would be performed by the classifier store and tree generator 242 illustrated in FIG. 2 on classifiers previously stored in the classifier store, including the new classifier added by the user. Classifier store and tree generator 242, might, for example, be configured to re-generate classifier trees each time a new classifier is added to the classifier store 242. The process begins by applying classifiers 600 to 602 to a clustering algorithm 604. The result is that some classifiers will be clustered as indicated by clusters 606 and 608 whereas other classifiers will remain single as illustrated at 610. The clustering algorithm 604 is designed to produce a cluster from pairs of classifiers so that a binary tree will result when the process is finished.

A cluster of classifiers, such as clusters 606 and 608 can be considered a set of training documents and a higher-level classifier, or meta-classifier, can be generated from the cluster of classifier documents using the same classifier generation process illustrated in FIG. 3. Thus, classifier cluster 606 can be applied to classifier generator 612 to generate meta-classifier 616. Similarly, classifier cluster 608 can be applied to generator 614 to generate meta-classifier 618.

If more than a single classifier remains, meta-classifiers, such as meta-classifiers 616 and 618, together with unclustered classifiers 610 can then be clustered, via a clustering algorithm 620, which can be the same algorithm as algorithm 604 or a different algorithm. Again, the clustering algorithm is designed to produce a cluster from two meta-classifiers. The result is a cluster of meta-classifiers of which cluster 622 is illustrated. The meta-classifier clusters can again be applied to a classifier generator 626, which can be the same as the generators 612 and 614, or different, to generate a meta-meta-classifier 628. The meta-meta-classifiers together with any un-clustered classifiers 624 are, in turn applied to another clustering algorithm 630. This process is repeated until a single root classifier 632 is generated.

Figure 7:
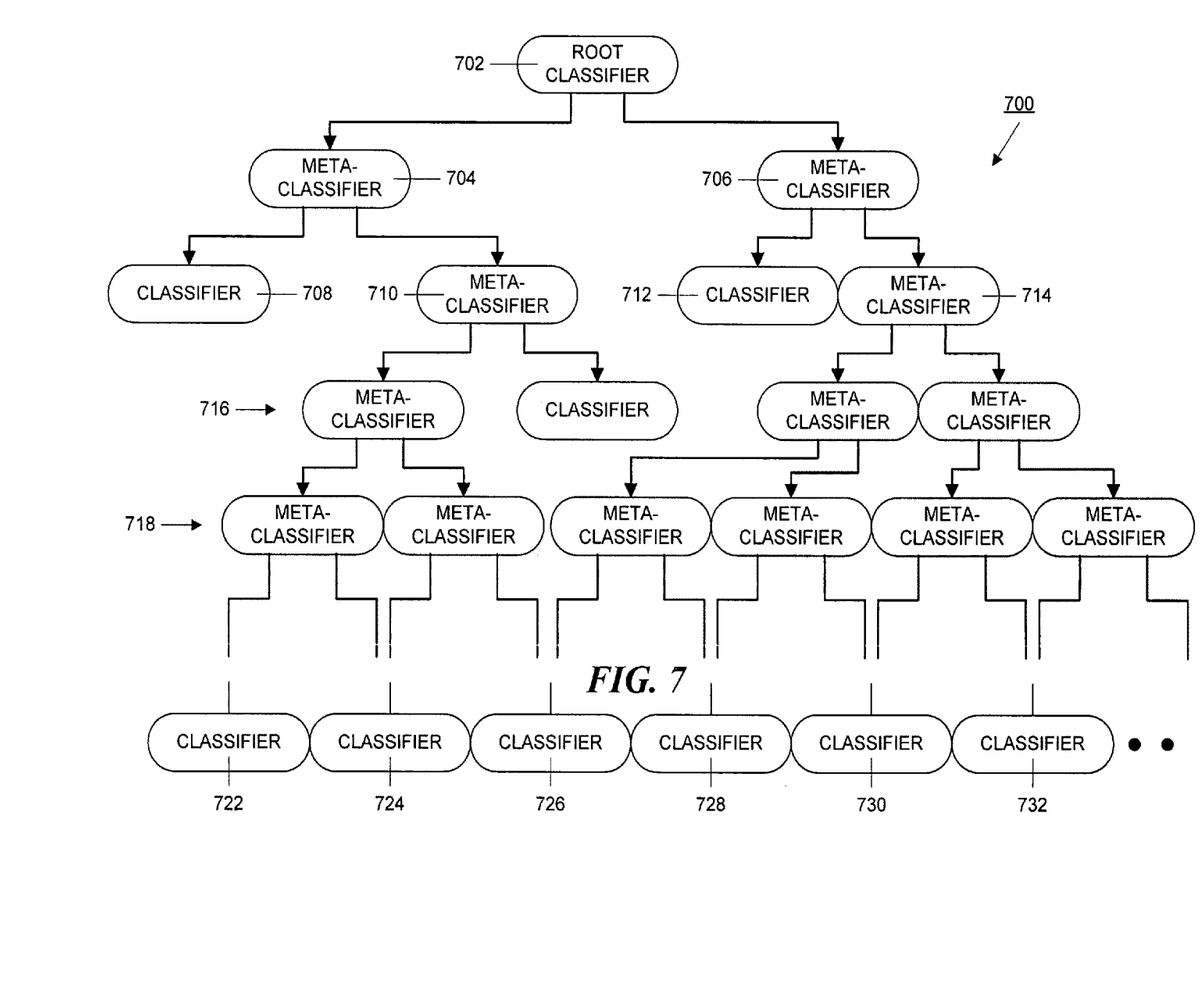
FIG. 7 is a schematic diagram that illustrates a binary classification tree produced by the process illustrated in FIGS. 6 and 7.

The result of the process illustrated in FIG. 6 is a binary tree hierarchy (or possibly a small forest) of classifiers built from classifiers (which were built from classifiers . . . ) as shown in FIG. 7. The binary tree 700 has root classifier 702 node as its highest level. The tree 700 is constructed so that each node has two nodes that can be selected. Thus, once the classifier associated with a node indicates a match for a new document, at most two other classifiers must be checked for a match. For example, if root classifier 702 matches a document, then, at most, meta-classifiers 704 and 706 need be checked for matches. Since the meta-classifiers are produced by a clustering algorithm, if meta-classifier 704 indicates a match, then classifier 706 need not be checked. Instead, meta-classifiers 708 and 710 are checked. However, if meta-classifier 704 does not match a new document, then meta-classifier 706 is checked for a match. If a match is obtained with meta-classifier 706, then one or both of meta-classifiers 712 and 714 are checked.

Assuming a match is obtained at one of the two nodes at a tree level, this process proceeds through each level 716 and 718 of the tree until the lowest or leaf level 720 is reached. In level 720, all of the nodes, of which nodes 722-732 are shown, consist of single classifiers. Alternatively, if neither of the meta-classifiers in the nodes at a given level produces a match, then the meta-classifier associated with the node in the previous tree level that did produce a match is used to place the document in a category. For example, if a match is obtained with the meta-classifier in node 704, but neither the classifier 708 nor the meta-classifier 710 produces a match, then meta-classifier 704 is used to categorize the document.

The classifier trees generated by the classifier store and tree generator 242 are provided to the document manager 238 as indicated schematically by arrow 246 for use by the document manager 238 in classifying incoming resource content.

In accordance with the principles of the invention, a user may submit classifiers that have been generated and stored in the classifier store 242 to other repositories. In particular, each repository maintains and publishes a web server, such as web server 236, to which other repositories can submit classifiers. If a first user has built a classifier for their own personal resources, this classifier could be communicated to a second user's repository. For example, via the user interface 218, the user can select a classifier and control the classifier store and tree generator 242 to transfer the selected classifier to the web interface 226 as indicated schematically by arrow 224.

Figure 8:
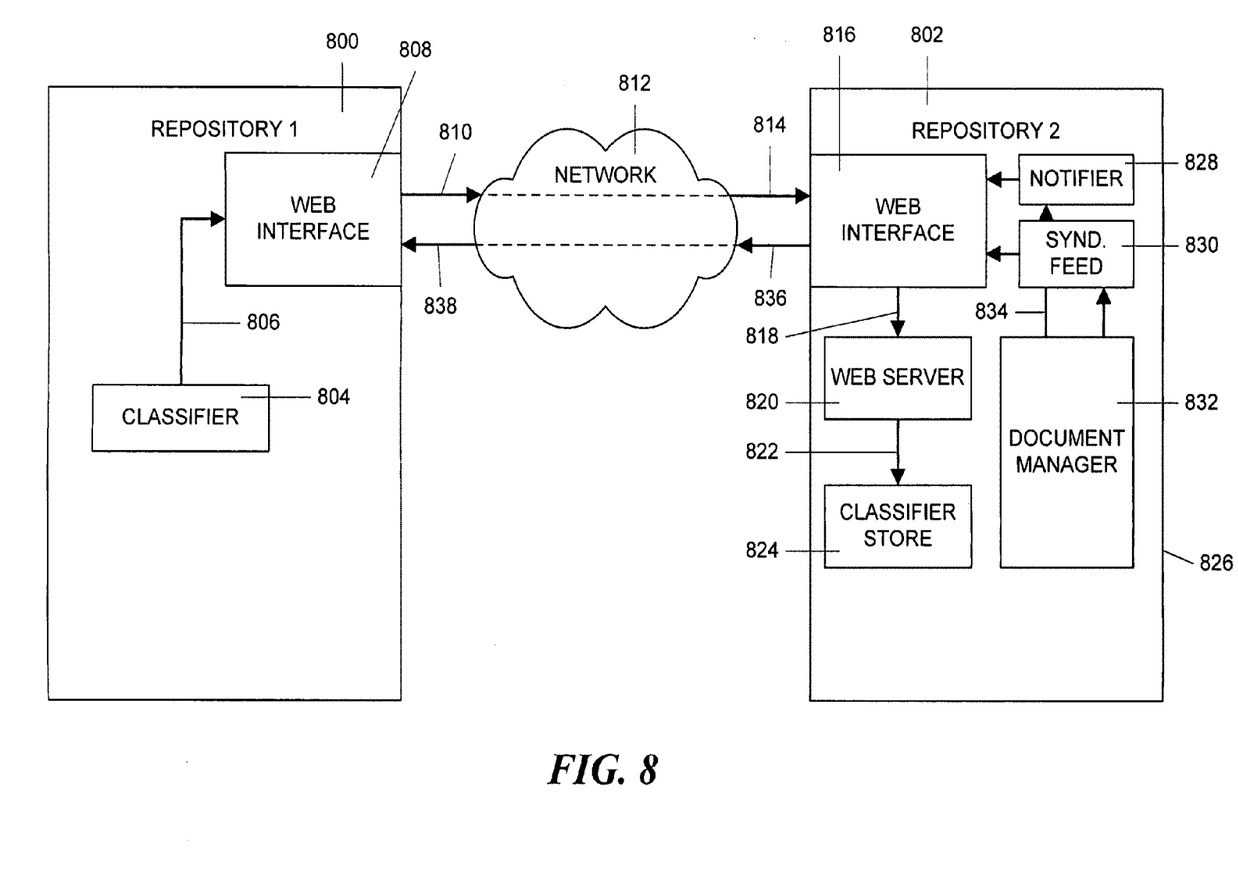
FIG. 8 is a block schematic diagram illustrating the submission of a classifier from one repository to another repository.
Figure 9:
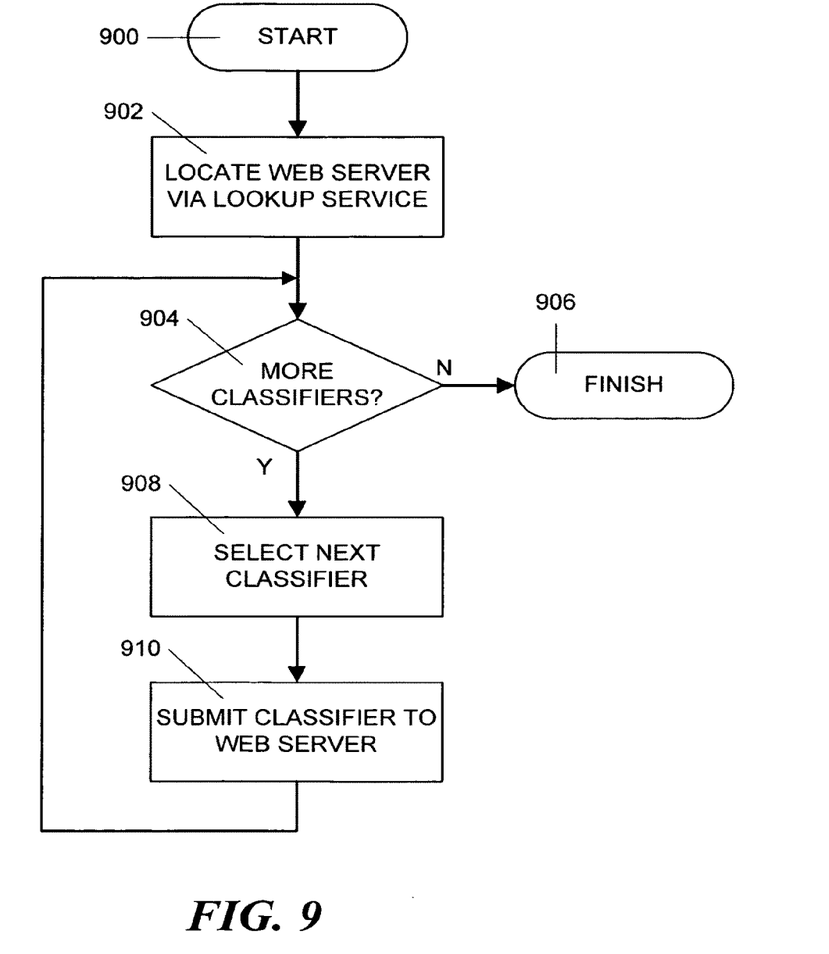
FIG. 9 is a flowchart showing the steps in an illustrative process for submitting a classifier from one repository to another repository.

This process is illustrated in more detail in FIG. 8 and the steps in the process are illustrated in the flowchart shown in FIG. 9. In particular, the process starts in step 900 and proceeds to step 902 where a first user associated with repository 1 (800) locates the web server 820 in repository 802 to which the first user desires to submit a classifier. The process then proceeds to step 904 where a determination is made whether additional classifiers will be submitted to repository 802.

If further classifiers remain to be submitted, as determined in step 904, then, in step 908, the next classifier to be transferred is selected, for example, classifier 804. As previously mentioned, classifier 804 is provided to web interface 808 in repository 800 as indicated by arrow 806. Then, in step 910, the classifier is submitted to the web server 816. In particular, web interface 808 transfers the classifier to the location of web server 820, as previously determined, as indicated schematically by arrow 810, for example, via the Internet 812 or some other network, to the web interface 816 as indicated by arrow 814. The process then returns to step 904 to determine whether further classifiers remain to be submitted. If so, processing continues in the manner discussed above. If no further classifiers remain to be submitted, then the process terminates in step 906.

Referring to FIG. 2, a classifier arriving at web interface 226 from another repository is provided to the web server 236 as indicated by arrow 222. The web server 236 can then enter that classifier into the classifier store 242 as indicated by arrow 240. The web server 236 may also trigger the classifier store and tree generator 242 to regenerate the classifier trees from the contents of the classifier store including the classifier received from the other repository. Alternatively, the classifier store and tree generator 242 can regenerate the classifier trees on a predetermined schedule. In FIG. 8, classifiers arriving at web interface 816 are provided to web server 820 as indicated by arrow 818. From web server 820, the classifiers are entered into the classifier store 824 as indicated by arrow 822.

After the classifier trees in the classifier store 824 have been rebuilt, when new resource content is added to repository 802, it is classified by document manager 826 using the classifier trees that include the classifiers that were submitted by the first user.

Figure 10:
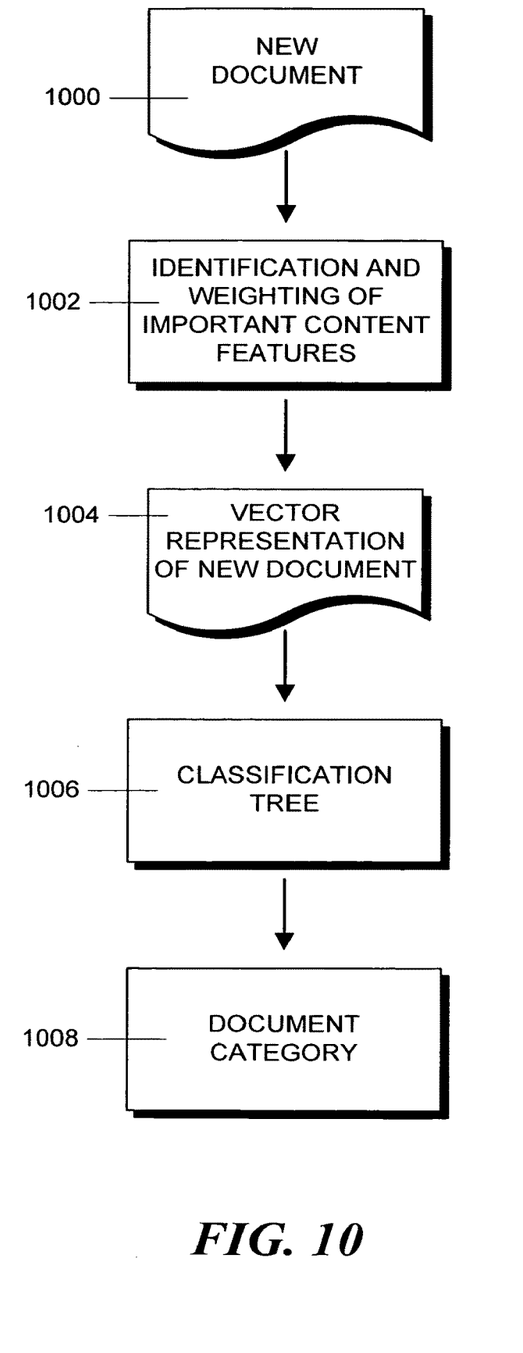
FIG. 10 is a block schematic diagram of a process used by a document manager for automatically classifying a new document using a classification tree as illustrated in FIG. 7.
Figure 11:
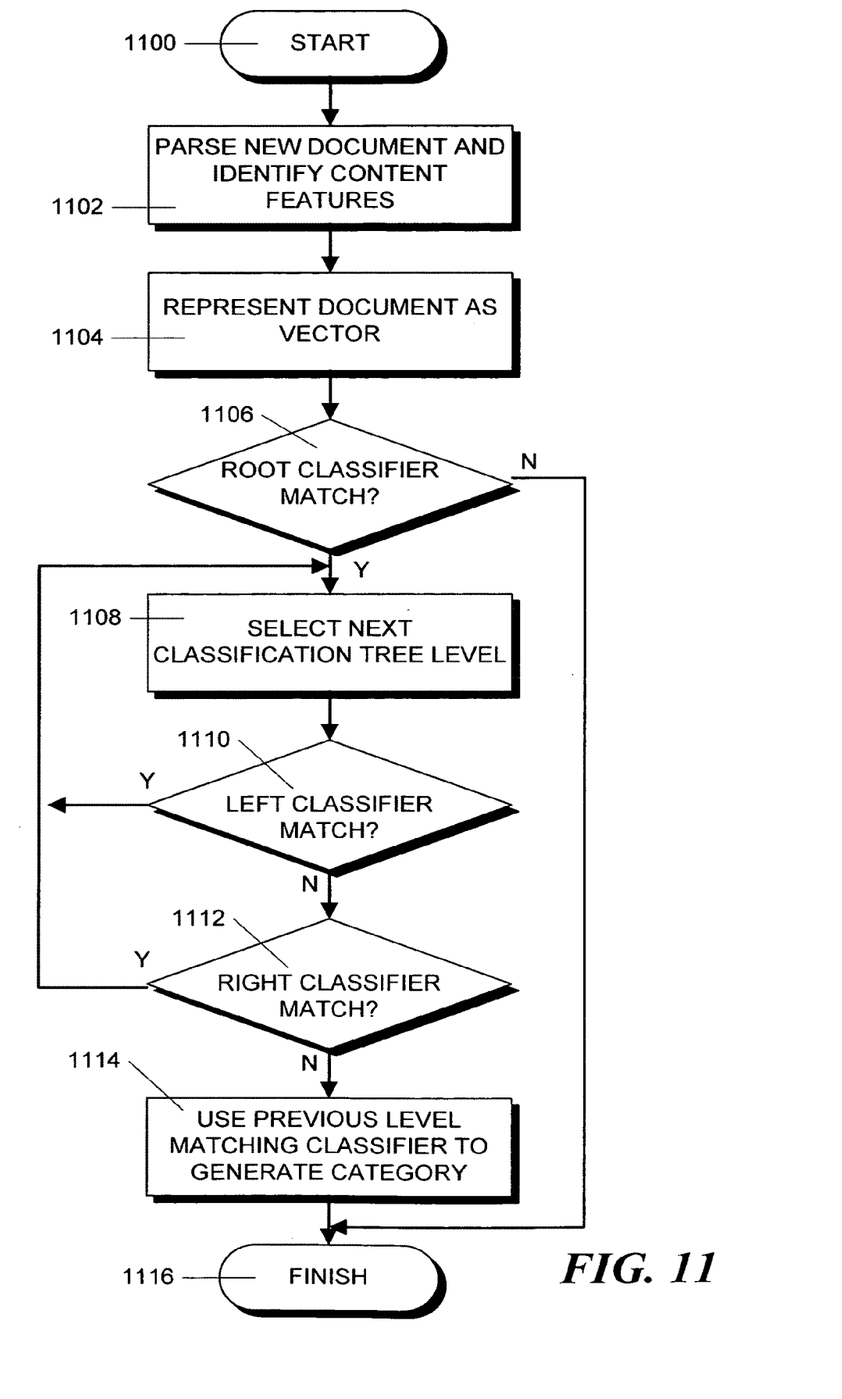
FIG. 11 is a flowchart showing the steps in an illustrative process for classifying a new document by comparing a vector representation of the document to meta-classifiers in a classification tree as illustrated in FIG. 7.

The process of using a classifier tree to place a new document, representing new content from a resource into a category is shown in FIGS. 10 and 11. This process starts in step 1100 and proceeds to step 1102 where a new document 1000 is parsed to identify and weigh important content features 1002 in a conventional manner. In step 1104, these features are used to represent the new document as a vector 1004 also in a conventional manner. The vector representation 1004 is then applied to the classification tree 1006 that is constructed as described above. The process of using the classification tree 1006 is shown in steps 1106-1114. The process starts at the root classifier of the tree in order to check whether the new document should be classified into the given tree. In particular, in step 1106, a determination is made whether the root classifier generates a match. If no match occurs, the process proceeds to finish in step 1116 because the classification tree is not applicable to the new document. Other classification trees may then be used.

Alternatively, if in step 1106, the root classifier generates a match, then, in step 1108, the next lower level in the classification tree is selected. Since the tree is a binary tree, this next level will have two meta-classifiers. In step 1110, the "left" classifier of the two classifiers is checked. If there is a match, the "right" classifier need not be checked. Instead, the process proceeds back to step 1108 to select the next lower level of the classification tree that branches from the currently selected node. Thus, the search process proceeds in a "depth-first" manner.

If, in step 1110, no match occurs, then, in step 1112, the "right" classifier of the meta-classifier pair is checked for a match. If a match occurs, the process returns to step 1108 where the next lowest level of the classification tree from the selected node is now selected and the process repeated.

If no match occurs at step 1112, then the lowest level of the tree at which the classifiers are applicable has been reached. At this point, a cluster of classifiers against which the new document should be evaluated is determined by the matching meta-classifier of the previous level. The classifiers in this cluster are then evaluated to determine the category or categories in which the document will be placed, as set forth in step 1114. The process then finishes in step 1116. The result is a document category or categories 1008.

If new resource content matches a classifier, the document manager processing that resource content sends the content to an archive in the target repository identified by that classifier. In most cases, the target repository will be the repository in which the document manager is located. Thus, for example, in FIG. 2, if document manager 238 determines that the target repository is repository 200, then the document manager 238 sends the content to archive 254 as indicated by arrow 256.

However, in accordance with the principles of the invention, if the target repository is a different repository, then document manager 238 provides the document content to web interface 226 as indicated by arrow 244. The content is then sent to the other repository identified by, for example, a URI specified in the classifier. Each repository monitors its identified address to check for the arrival of new content. For example, repository 200 has a connector 232 that monitors its URI as indicated schematically by 234. When new content arrives at the URI, connector 232 transfers this content to document manager 238 as indicated by arrow 230 in the same manner that connectors 202-214 transfer content to document manager 238.

When new content arrives at document manager 238, the content is indexed and stored in archive 254 in the manner discussed above. This mechanism provides for a group information discovery mechanism. When a first user finds content that would interest a second user, the content is automatically placed in the second user's repository.

In order to alert the second user that relevant content has been identified, the document manager that identifies the content can alert the second user. For example, as illustrated in FIG. 8, upon identifying content that matches a classifier submitted by repository 800, document manager 832 can instruct notifier 828 as indicated by arrow 834 to send a notification to repository 800 via web interface 816. Web interface 816 sends the notification as indicated schematically by arrow 836, Internet 812 and arrow 838 to web interface 808. Alternatively, document manager 826 can post the notification to public distribution area, such as conventional syndication feed 830. Repository 800 can then poll the syndication feed 830, via web interfaces 808 and 816, to discover when new content has been added to repository 800.

In another embodiment, instead of actually transferring content between repositories, a first user associated with a first repository could request that a second repository associated with a second user simply notify the first repository whenever the second repository adds new resource content to a particular category in the second repository. This could be accomplished by the first user submitting a classifier to the second repository, which classifier identifies content for the category. In this manner the first user is notified about anything that the second user finds interesting in a particular category.

Similarly, in yet another embodiment the inventive system can be used in situations where a user works on materials that, for security reasons, he or she cannot allow anyone else to see. This user may have spent a great deal of effort on the construction of a classifier for a particular class of documents. He could decide to share his classifier for this class of documents without having to share the documents from which the classifier was constructed. This can be accomplished by making a copy of the classifier and changing the target repository identifier to identify a repository with which the user wishes to share information. The user then instructs the document manager to notify the other repository when relevant information is identified, but not to forward the content to the other repository. Alternatively, a user can simply forward a classifier that he or she has constructed to another repository for use in that repository. Further, a user can also forward an entire classifier tree, or trees, to another user to enable that other user to classify content in the same manner as the first user.

A software implementation of the above-described embodiment may comprise a series of computer instructions either fixed on a tangible medium, such as a computer readable media, for example, a diskette, a CD-ROM, a ROM memory, or a fixed disk, or transmittable to a computer system, via a modem or other interface device over a medium. The medium either can be a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, the inventive method and apparatus can be used with any conventional clustering algorithms and algorithms for generating classifiers. The order of the process steps may also be changed without affecting the operation of the invention. Other aspects, such as the specific process flow, as well as other modifications to the inventive concept are intended to be covered by the appended claims.

What is claimed is:

1. A method for searching and resource discovery in a distributed enterprise, the method comprising:
    generating a first classifier for a first repository in the distributed enterprise;
    generating a second classifier for a second repository in the distributed enterprise, wherein the second classifier comprises a vector element identifying a location of the second repository;
    submitting a copy of the second classifier to a web server of the first repository;
    obtaining a resource at the first repository after submitting the copy of the second classifier;
    matching the resource to the copy of a second classifier;
    sending a copy of the resource to the second repository using the vector element; and
    storing the copy of the resource in the second repository.

2. The method of claim 1, further comprising:
    indexing the copy of the resource at the second repository after storing the copy.

3. The method of claim 1, further comprising:
    notifying the first repository that a copy of the resource is stored in the second repository.

4. The method of claim 1, further comprising:
    posting a notification to a public distribution area after the copy of the resource is stored in the second repository; and
    polling the public distribution area to discover based on the notification that the copy of the resource is added to the second repository.

5. The method of claim 1, further comprising:
    generating the vector element identifying the location of the second repository after generating the second classifier; and
    inserting the vector element into the second classifier.

6. The method of claim 1, wherein the vector element is a uniform resource identifier (URI).

7. The method of claim 1, further comprising:
    generating a classifier tree for the second repository from all classifiers that are generated for the second repository and for all classifiers submitted to the second repository by other repositories; and
    comparing the copy of the resource to the classifier tree.

8. The method of claim 1, further comprising:
    matching the copy of the resource to the second classifier based on a dot product comparison of a weighted feature vector representation of the resource and the second classifier.

9. The method of claim 1, further comprising:
    generating a comparison between the resource and the first classifier after obtaining the resource at the first repository; and
    identifying a mismatch based on the comparison.

10. The method of claim 1, further comprising:
comparing a copy of the resource with a copy of the first classifier in the second repository prior to storing the copy of the resource.

11. The method of claim 1, further comprising:
submitting a copy of the first classifier from the first repository to a web server of the second repository prior to obtaining the resource at the first repository.

12. A system for searching and resource discovery in a distributed enterprise comprising:
a processor;
a memory operatively connected to the processor and storing instructions comprising functionality to:
generate a first classifier for a first repository in the distributed enterprise;
generate a second classifier for a second repository in the distributed enterprise, wherein the second classifier comprises a vector element identifying a location of the second repository;
submit a copy of the second classifier to a web server of the first repository; obtain a resource at the first repository after submitting the copy of the second classifier;
match the resource to the copy of a second classifier;
send a copy of the resource to the second repository using the vector element; and store the copy of the resource in the second repository.

13. The system of claim 12, the instructions further comprising functionality to:
index the copy of the resource at the second repository after storing the copy.

14. The system of claim 12, the instructions further comprising functionality to:
notify the first repository that a copy of the resource is stored in the second repository.

15. The system of claim 12, the instructions further comprising functionality to:
post a notification to a public distribution area after the copy of the resource is stored in the second repository; and
poll the public distribution area to discover based on the notification that the copy of the resource is added to the second repository.

16. The system of claim 12, the instructions further comprising functionality to:
generate the vector element identifying the location of the second repository after generating the second classifier; and
insert the vector element into the second classifier.

17. The system of claim 12, wherein the vector element is a uniform resource identifier (URI).

18. The system of claim 12, the instructions further comprising functionality to:
generate a classifier tree for the second repository from all classifiers that are generated for the second repository and for all classifiers submitted to the second repository by other repositories; and
compare the copy of the resource to the classifier tree.

19. The system of claim 12, the instructions further comprising functionality to:
match the copy of the resource to the second classifier based on a dot product comparison of a weighted feature vector representation of the resource and the second classifier.

20. The system of claim 12, the instructions further comprising functionality to:
generate a comparison between the resource and the first classifier after obtaining the resource at the first repository; and
identify a mismatch based on the comparison.

* * * * *